United States Patent
Sarajian et al.

(10) Patent No.: US 7,082,967 B2
(45) Date of Patent: Aug. 1, 2006

(54) MODULAR UMBRELLA VALVE

(75) Inventors: Kissak T. Sarajian, Montrose, CA (US); Michael R. Kohlmann, Milwaukee, WI (US)

(73) Assignee: Engineered Products & Services, Inc., Menomonee Falls, WI (US)

( * ) Notice: Subject to any disclaimer, the term of this patent is extended or adjusted under 35 U.S.C. 154(b) by 306 days.

(21) Appl. No.: 10/751,617

(22) Filed: Jan. 5, 2004

(65) Prior Publication Data

US 2005/0145284 A1    Jul. 7, 2005

(51) Int. Cl.
  *F16K 15/14* (2006.01)
(52) U.S. Cl. ............... 137/854; 137/512.15; 137/513.3
(58) Field of Classification Search ........... 137/512.15, 137/512.4, 513.3, 854
  See application file for complete search history.

(56) References Cited

U.S. PATENT DOCUMENTS

| | | | | |
|---|---|---|---|---|
| 3,454,182 A | * | 7/1969 | Morton | 220/374 |
| 3,880,187 A | * | 4/1975 | Kneusel | 137/843 |
| 3,976,096 A | | 8/1976 | Kass et al. | |
| 4,570,899 A | * | 2/1986 | Kingham | 251/51 |
| 4,750,314 A | * | 6/1988 | Mietz et al. | 53/470 |
| 5,129,426 A | * | 7/1992 | Boehmer | 137/854 |
| 5,173,033 A | | 12/1992 | Adahan | |
| 5,507,318 A | | 4/1996 | Israelson | |
| 5,619,972 A | | 4/1997 | Kuenzli et al. | |
| 5,649,859 A | * | 7/1997 | Shiga | 454/275 |
| 5,842,682 A | | 12/1998 | Schennum et al. | |
| 5,881,686 A | | 3/1999 | Schmidt | |
| 6,062,248 A | | 5/2000 | Boelkins | |
| 6,516,829 B1 | | 2/2003 | Townsend et al. | |

OTHER PUBLICATIONS

Vernay Laboratories, Inc., Umbrella Check Valve VA3497 (2 pages), 1998, <www.vernay.com>.
Vernay Laboratories, Inc., Vernay Umbrella Check Valve VA3497 Technical Information Sheet (2 pages), May 12, 2003, <www.vernay.com>.
Vernay Laboratories, Inc., Umbrella Check Valves (5 pages), 1998, <www.vernay.com>.
Vernay Laboratories, Inc., Umbrella Check Valves (4 pages), May 9, 2003, <www.vernay.com>.
Engineered Products and Services, Inc., Easy Caps (EZY) (3 pages), 2004, <www.epsi.com>.
Engineered Products and Services, Inc., Easy Cap photograph (1 page), undated, <www.epsi.com>.
Shercon plug photograph (1 page), undated.

* cited by examiner

*Primary Examiner*—Ramesh Krishnamurthy
(74) *Attorney, Agent, or Firm*—Jansson, Shupe, Munger & Antaramian, Ltd.

(57) ABSTRACT

An umbrella valve includes an elastic cap, and an elastic stem formed integrally with the cap, having a center hollow portion, having an enlarged hollow portion proximate the cap, and having a bottom. The valve has a needle having an enlarged head at a proximal end thereof for being snugly secured in the enlarged hollow portion of the stem, having a lower lateral hole in a distal portion, having an upper lateral hole proximate the bottom of the stem, and having a lengthwise center passageway connecting the upper and lower lateral holes. A method includes providing a needle for being snugly secured in one of a plurality of elastic caps, the needle having a lengthwise center passageway connecting upper and lower lateral holes. The method includes selecting a cap from among the plurality of elastic caps by determining opening pressure factors.

21 Claims, 6 Drawing Sheets

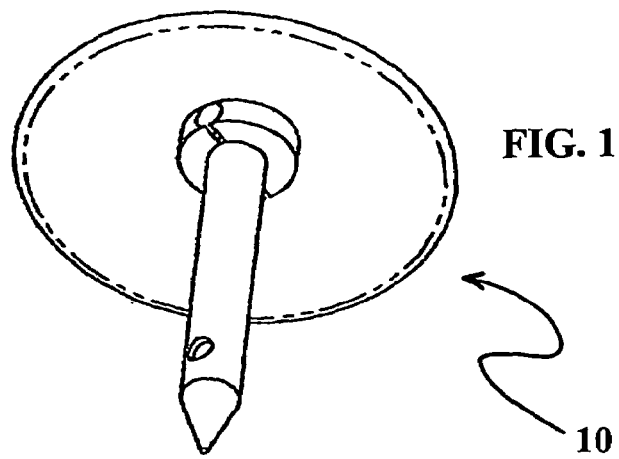
FIG. 1
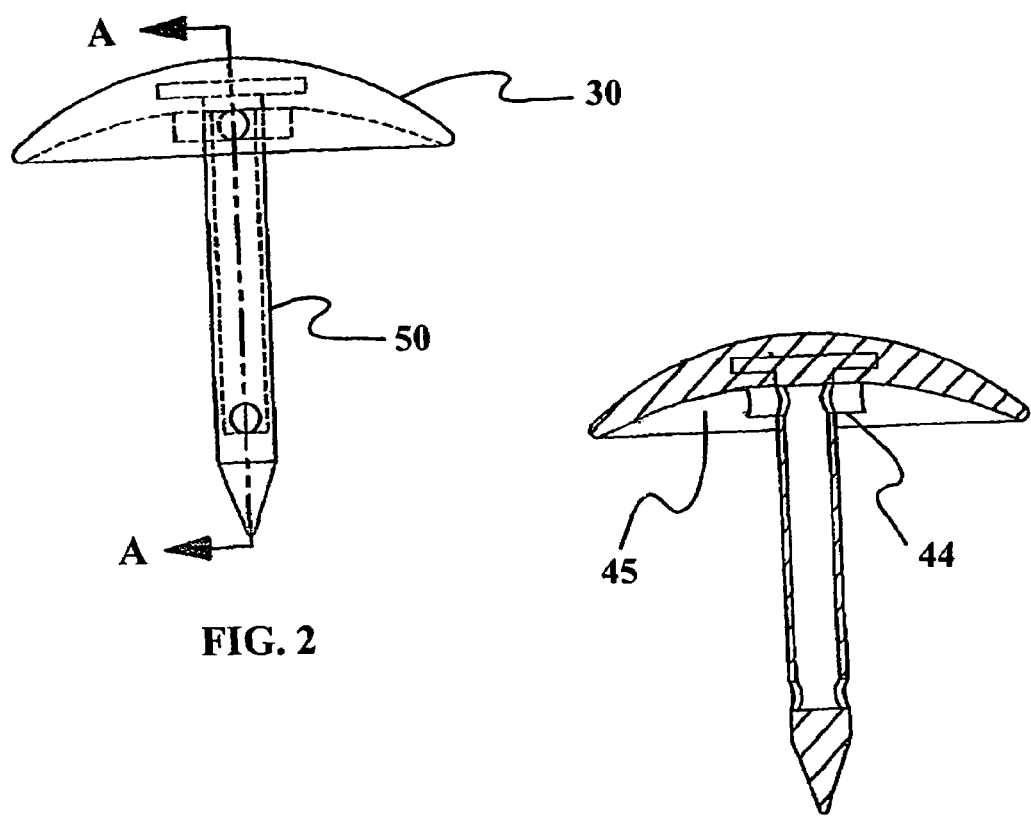
FIG. 2
FIG. 3

FIG. 11
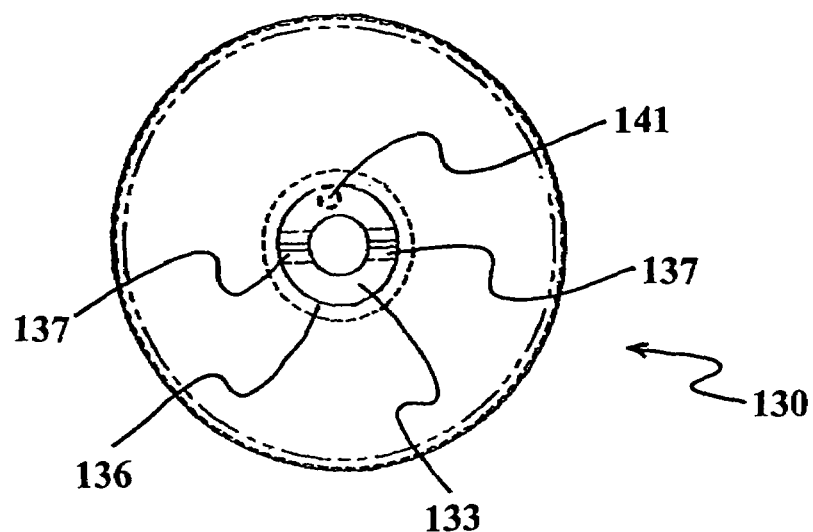
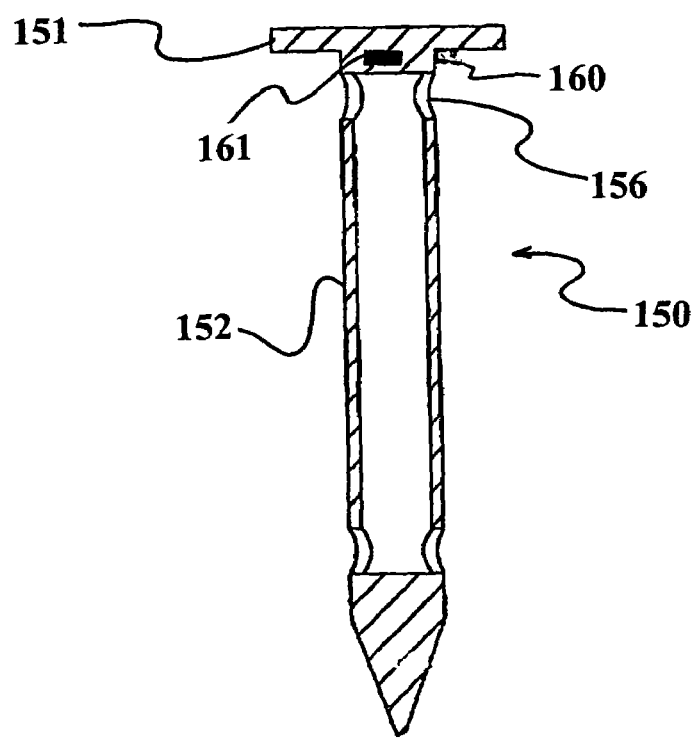
FIG. 12

MODULAR UMBRELLA VALVE

BACKGROUND

1. Field of the Invention

The invention relates to apparatus, systems, and methods for pressure relief through an orifice and, more particularly, to an umbrella type check valve.

2. Background of the Invention

There are many applications where it is desirable to provide a pressure relief at a particular location. For example, an automotive application may utilize a crankcase breather valve for ventilation and pressure control in an internal combustion engine while also controlling the direction of flow of fluids, pressure, contaminants, etc. Other examples of pressure relief and flow control may be found in automotive as well as medical, appliance, manufacturing process, pumps, and other areas of technology.

An umbrella type check valve is known. Typically, such a valve has a spherical surface that substantially conforms to the contour of the underside of the check valve. The valve is formed of an elastic material so that the spherical surface returns to its nominal shape after being temporarily deformed. The spherical 'cap' is typically formed along with a plug or stem that is inserted into an orifice for securing the cap in a position that 'seats' against a mounting surface. When the pressure adjacent the orifice becomes large enough, the pressure passes to the underside of the cap and causes the cap to lift off the mounting surface, thereby releasing the pressure to the outside. After releasing the pressure, the elastic cap returns to its seated position on the mounting surface.

However, such umbrella check valves require that holes be drilled or otherwise machined in a plug portion of the valve or in the adjacent mounting surface, in order to provide a pathway for passing the pressure from beneath the plug to the underside of the cap. This machining is expensive, resulting in a higher cost and longer manufacturing time for the umbrella valve. In addition, the extra holes in the plug or mounting surface may result in impurities entering the holes thereby defeating a one-way function of the umbrella valve. Additional related problems exist for conventional umbrella valves.

OBJECTS OF THE INVENTION

It is an object of the invention to provide an improved umbrella valve overcoming some of the problems and shortcomings of the prior art, including those referred to above.

Another object of the invention is to provide an improved structure for masking a hole, whereby a possibility of breach of the masking structure is reduced.

Another object of the invention is to provide an umbrella check valve with a self-cleaning ability.

Still another object of the invention is to provide a modular umbrella valve system where component parts may be changed to accommodate different opening pressure factors of a particular use.

Yet another object of the invention is to provide a modular umbrella valve system where component parts may be changed to accommodate size requirements of a particular application.

Another object of the invention is to provide an umbrella valve that is easier to manufacture compared with prior art devices.

An additional object of the invention is to provide an umbrella valve that requires less machining during its manufacture.

Another object of the invention is to provide an umbrella type pressure check valve that may obviate a need to drill holes in an accompanying object receiving pressure relief.

Yet another object of the invention is to provide a modular umbrella valve system where a degree of modularity may be selected for a particular application.

How these and other objects are accomplished will become apparent from the following descriptions and drawing figures.

SUMMARY

According to a first aspect of the invention, an umbrella valve includes an elastic cap, an elastic stem formed integrally with the cap, having a center hollow portion, having an enlarged hollow portion proximate the cap, and having a bottom, and a needle having an enlarged head at a proximal end thereof for being snugly secured in the enlarged hollow portion of the stem, having a lower lateral hole in a distal portion, having an upper lateral hole proximate the bottom of the stem, and having a lengthwise center passageway connecting the upper and lower lateral holes.

According to another aspect of the present invention, a modular umbrella valve system includes a plurality of elastic caps each having a radial shaped portion and an outer edge portion, the outer edge portion being formed along a mating plane, the elastic caps also each having a stem portion normal to the mating plane, each stem portion having a recess of a first size, and a needle having an enlarged head at a proximal end thereof for being snugly secured in the recess of any one of the plurality of elastic caps, the needle having a lower lateral hole in a distal portion, having an upper lateral hole proximate the bottom of the stem portion, and having a lengthwise center passageway connecting the upper and lower lateral holes.

According to an additional aspect of the invention, an umbrella valve includes an elastic cap having a sealing surface and having a stem extending from a center portion of the cap in a direction normal to the sealing surface, the stem having a center hollow portion, having an enlarged hollow portion, and having a bottom, a needle having an enlarged head at a proximal end thereof for being snugly secured in the enlarged hollow portion of the stem, having a lower lateral hole in a distal portion, having an upper lateral hole proximate the bottom of the stem, and having a lengthwise center passageway connecting the upper and lower lateral holes, and a plug adapted for receiving the needle and stem.

According to a further aspect of the invention, a method of customizing an umbrella valve includes providing a needle having a head at a proximal end thereof for being snugly secured in a recess of any one of a plurality of elastic caps, the needle having a lower lateral hole in a distal portion, having an upper lateral hole, and having a lengthwise center passageway connecting the upper and lower lateral holes, selecting an elastic umbrella cap from among the plurality of elastic caps, each elastic cap having the recess of a same size, by determining opening pressure factors including at least one of preload, umbrella skirt thickness, umbrella skirt shape, umbrella skirt diameter, and material used for forming the respective cap.

According to an additional aspect of the invention, a method of preparing an umbrella type check valve includes providing an elastic cap, forming an elastic stem integrally with the cap, the stem having a center hollow portion, having an enlarged hollow portion proximate the cap, and having a bottom, and inserting a needle having a head at a proximal end thereof into the stem by snugly securing the enlarged head into the enlarged hollow portion of the stem, where the needle has a lower lateral hole in a distal portion, has an upper lateral hole proximate the bottom of the stem, and has a lengthwise center passageway connecting the upper and lower lateral holes.

According to another aspect of the invention, a method includes providing an umbrella valve having an elastic cap, an elastic stem formed integrally with the cap, having a center hollow portion, having an enlarged hollow portion proximate the cap, and having a bottom, and a needle having a head at a proximal end thereof for being snugly secured in the enlarged hollow portion of the stem, having a lower lateral hole in a distal portion, having an upper lateral hole proximate the bottom of the stem, and having a lengthwise center passageway connecting the upper and lower lateral holes, the method also including installing the umbrella valve in an orifice for relieving pressure via the orifice while preventing contaminants from entering the orifice.

As a result of the invention, manufacturing of an umbrella valve is simplified by reducing machining or similar steps required for forming the valve. An improved structure for masking a hole reduces a possibility of breach of the mask. This is especially important for processes that include several vulnerable steps such as washing, painting, dipping, etc. A modular system is provided for reducing parts inventory while increasing the ability for on-site customizing of umbrella valves for a particular use. Providing functional advantages in an umbrella type pressure check valve may eliminate a need to drill holes in an accompanying object receiving pressure relief. A modular umbrella valve system may be two, three, or more individual pieces. A stem portion may be formed in any shape so that, for example, a two piece structure may be quite useful for an operation that is only concerned with preventing inflow of contaminants such as during a washing operation. By comparison, using three components, such as by using a plug, allows precision masking to be effected, for example in a painting process. A degree of modularity may be selected for a particular application.

Additional advantages and a more complete understanding of the present invention may be derived by referring to the detailed description of preferred embodiments and claims when considered in connection with the figures, wherein like reference numbers refer to similar items throughout the figures.

BRIEF DESCRIPTION OF THE DRAWINGS

FIG. 1 is a three dimensional view of an umbrella check valve according to an exemplary embodiment of the present invention.

FIG. 2 is a side view of the umbrella valve of FIG. 1.

FIG. 3 is a side view of the umbrella valve of FIG. 1 taken along the line A—A of FIG. 2.

FIG. 11 is a bottom view of an elastic cap used in an umbrella valve according to an exemplary alternate embodiment of the present invention.

FIG. 12 is a side cutaway view of a needle used in an umbrella valve according to an exemplary alternate embodiment of the present invention.

DETAILED DESCRIPTION OF PREFERRED EMBODIMENTS

FIGS. 1–10 illustrate an exemplary embodiment of an umbrella valve 10 according to the invention. Umbrella valve 10 has two component parts, cap 30 and needle 50.

Figure 4:
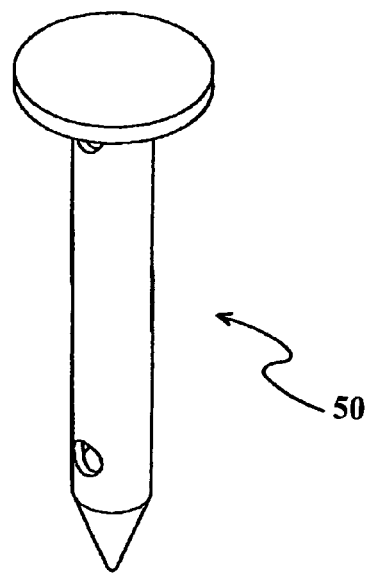
FIG. 4 is a three dimensional view of a needle portion of the umbrella check valve of FIG. 1.
Figure 5:
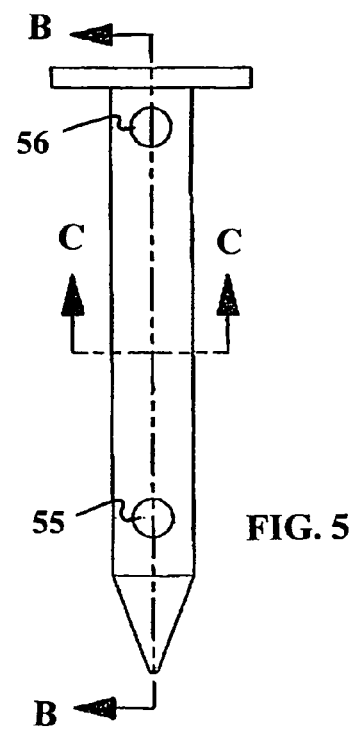
FIG. 5 is a side view of the needle of FIG. 4.
Figure 6:
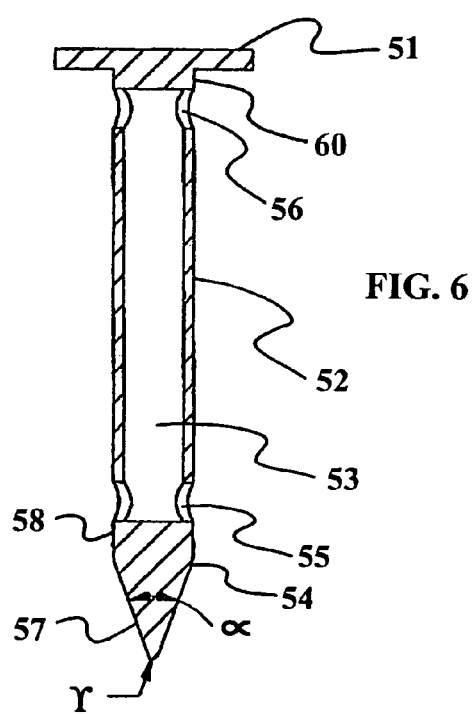
FIG. 6 is a vertical view of a shaft portion of the needle of FIG. 4 taken along the line B—B of FIG. 5.
Figure 7:
FIG. 7 is a side view of the needle of FIG. 4 taken along the line C—C of FIG. 5.
Figure 8:
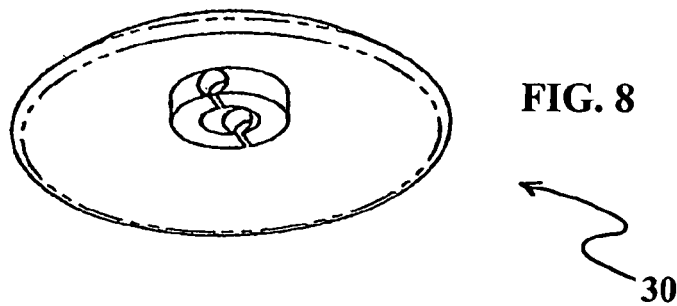
FIG. 8 is a three dimensional view of an elastic cap portion of the umbrella valve of FIG. 1.
Figure 9A:
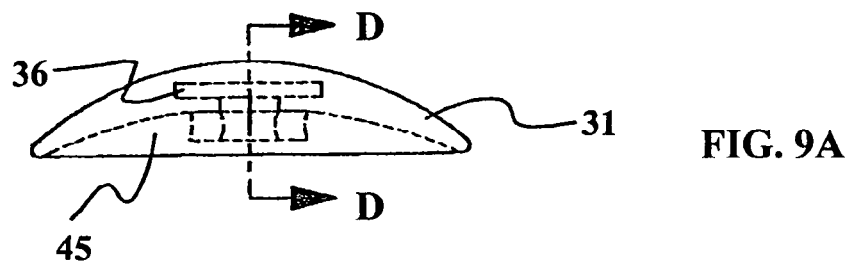
FIG. 9A is a side view of the cap of FIG. 8.
Figure 9B:
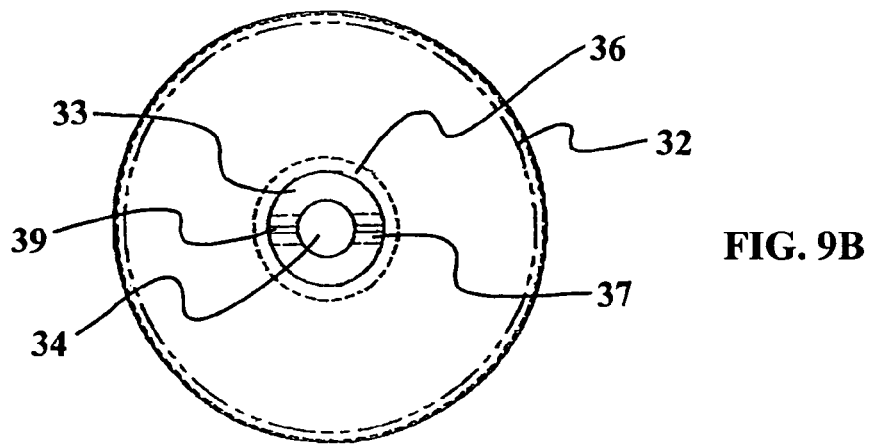
FIG. 9B is a bottom view of the cap of FIG. 8.
Figure 10:
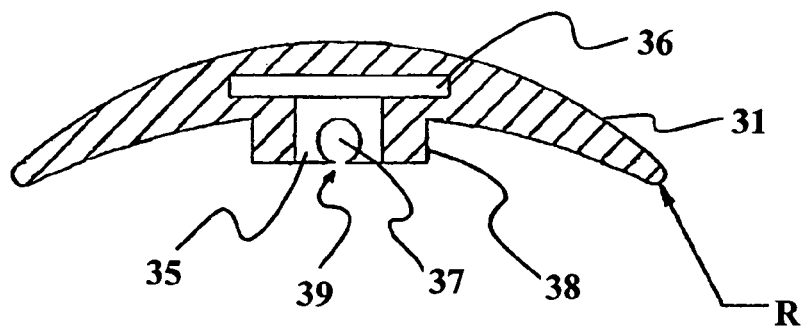
FIG. 10 is a side view of the cap of FIG. 8 taken along the line D—D of FIG. 9A.
Figure 13:
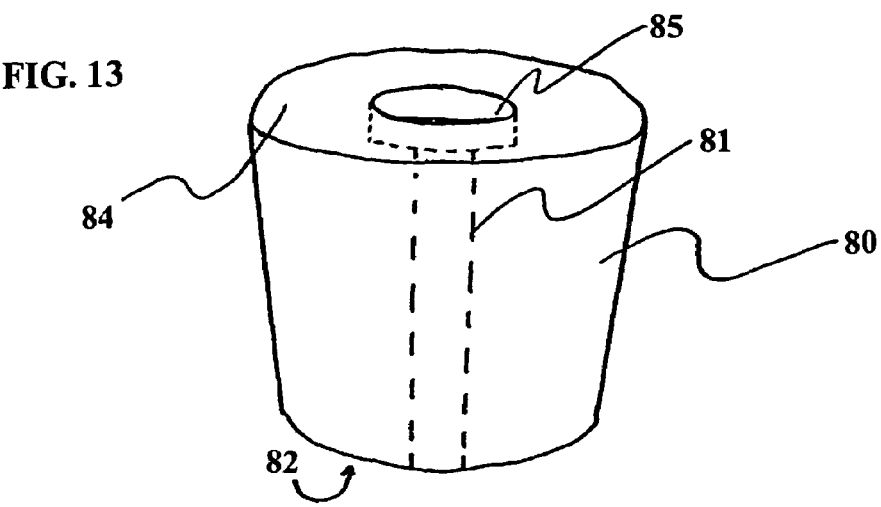
FIG. 13 shows a plug adapted for receiving an umbrella valve, according to an exemplary embodiment of the invention.
Figure 14:
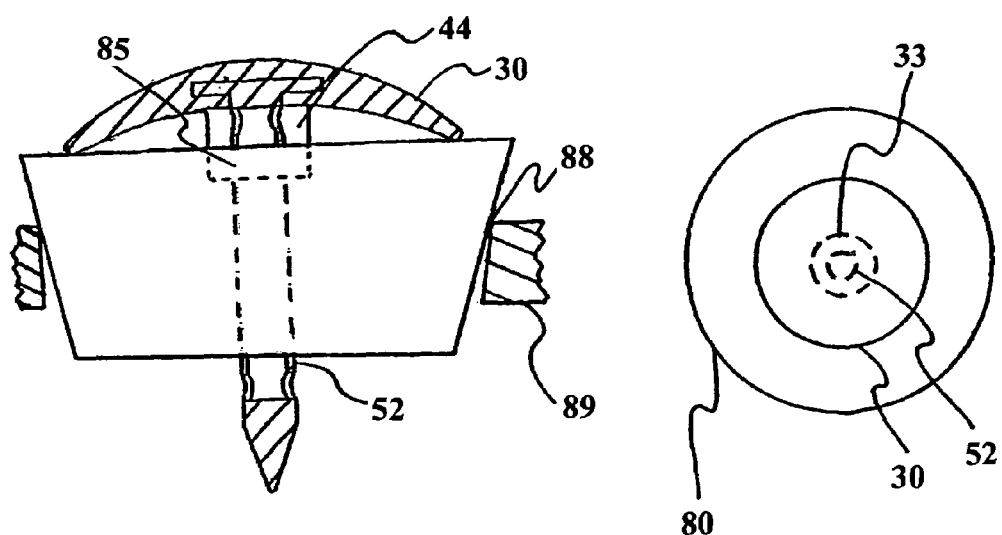
FIG. 14 is a side cutaway view of an umbrella valve inserted into a plug that, in turn, is installed in an orifice of an object being masked, according to an exemplary embodiment of the invention.
Figure 15:
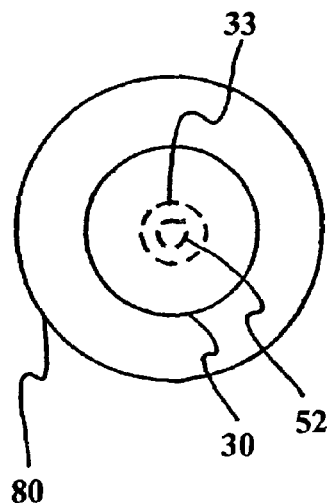
FIG. 15 is a top view of the assembly having a plug and umbrella valve, according to an exemplary embodiment of the invention.

Cap 30 is formed of an elastic material, for example, nitrile, viton, fluorosilicone, neoprene, ethylene propylene (EPDM), silicone, hydrogenated nitrile, butyl, fluorocarbon, polyisoprene, epichlorohydrin, chloroprene, polyurethane, styrene-butadiene, polyacrylate acrylic, and others. A preferred embodiment uses silicone in forming a cap for masking a hole during manufacturing processes and is described further below. Cap 30 has a round mushroom or saucer type shape for a main portion 31. This cap shape may alternatively be formed with a shape that conforms to that of a mating surface, or an other umbrella shape may be used for a particular application. The outer periphery of the main portion 31 has a sealing surface 32 with a flat face, with a tapered profile, with a rounded sealing edge, or with a shape accommodating a particular sealing application. For example, a pressure drop across valve 10 may be controlled by selecting a cap with a particular thickness of its sealing surface 32. In this example, a radius R of the end of sealing surface 32, as shown in FIG. 10, is ten mils.

Cap 30 is formed with an integral stem portion 33 that extends from a bottom portion of cap 30 at a center thereof. Stem 33 has a round cross section with a central core 34. In this example, a lower portion 35 of central core 34 has a diameter of two millimeters, and an end portion 36 of central core 34 has a diameter of five millimeters. The stem 33 and the center of main portion 31 are adapted for receiving needle 50 in the central core 34. The body 38 of stem 33 may be vertical, as shown, may have a tapered "stopper" shape, may have external threads, etc. In addition, cap 30 may be formed to function as a pull plug by having a grip portion (not shown) for quick removal of umbrella valve 10.

Needle 50 in this example has a head 51 with a diameter of five millimeters and a long cylindrical body 52 with an outside diameter of two millimeters. The shapes and sizes of portions of the central core of cap 30 conform to the shapes and sizes of the corresponding portions of needle 50. Therefore, when needle 50 is inserted into cap 30, the head 51 and cylindrical body 52 of needle 50 snugly fit, respectively, in the corresponding end portion 36 and lower portion 35 of the central core 34 of cap 30. Needle 50 is preferably formed of a rigid material such as stainless steel, so that it may be easily inserted into or removed from cap 30 by temporarily deforming the elastic material of cap 30. A use of stainless steel has advantages such as resistance to oxidation and durability. Such a needle may be re-used for a large number of installations into and removals from various caps. Metals such as aluminum and others, rigid plastic such as PVC, semi-rigid (high durometer) elastomer or rubber, or composite materials may alternatively be used for forming needle 50, depending on a given application. A needle may be have various shapes, including having a tapered portion, having threads for being installed in a threaded receptacle, etc.

Needle 50 has an air passage 53 in the core of cylindrical body 52. In this example, air passage 53 is defined as the inside diameter of the cylindrical body 52 and has a dimension of 1.5 millimeters. The air passage extends between head portion 51 and tip portion 54 of needle 50. Head 51 and tip 54 are each solid portions. A lower lateral hole 55 extends through needle 50 proximate the tip portion 54. An upper lateral hole 56 extends through needle 50 proximate the head portion 51. In this example, the height h of the flange portion of head 51 of needle 50 is 0.5 mm, and the combined length l of the remainder of needle 50 is fifteen millimeters. The distance between upper lateral hole 56 and lower lateral hole 55 is ten millimeters. Tip 54 has a beveled portion 57 and a straight portion 58. Beveled portion 57 is formed with an included angle α of, for example, forty degrees. In this example, the radius r of tip portion 54 is a maximum of 0.1 mm.

When needle 50 is inserted into cap 30, the upper lateral hole 56 is aligned on each side of needle 50 with corresponding exit holes 37 formed in stem portion 33 of cap 30. The exit holes 37 are at least as large as upper lateral holes 56 so that the flow through holes 56 is not impeded. As shown, for example, a break 39 may result in the bottom 44 of stem 33 when needle 50 is inserted into cap 30. Alternatively, depending on a shape of cap 30, it may be possible to locate the upper lateral hole 56 at a position below the bottom 44 of stem portion 33.

By way of example, an umbrella check valve may be used in a powdercoating, electrocoating, electroplating, chemical wash, or any other surface treatment operation for masking an orifice of an object to be painted, coated, plated, washed, etc. Such a valve may be used when a pressure is created inside the object as a result of subjecting the object to high temperatures. If a simple masking plug were used, it may pop out due to the pressure, resulting in a breach of the mask and intrusion of paint and other impurities into the orifice. By utilizing a venting mask device such as an umbrella type check valve, the pressure is passed from the orifice into the volume of space underneath the cap of the umbrella valve and, when the pressure exceeds a threshold, it causes the elastic cap to lift off the surface of the object, releasing the pressure to the outside. When the pressure is released, the cap returns to its seated position on the mounting surface. In such a manner, the umbrella valve acts as a one-way valve. It is noted that powdercoating is essentially a dry process, while other processes may involve liquid immersion. The valve of the invention is intended to be used in either a dry or a liquid type process.

Conventional umbrella valves provide a pathway for the pressure to the underside of the cap by machining holes into a plug portion of the umbrella valve or by a similar use of a vent hole drilled into the object itself. The present inventors have determined that a much simpler construction of an umbrella valve results from the modular system disclosed herein. For example, a user of umbrella check valves may re-use needle 50 while changing caps 30 for particular applications. The user may order new caps 30 for particular applications without a need to re-order the needle portions 50. The supplier of the umbrella valves saves time and money in producing the valves by eliminating the machining of the holes in the plug portion.

In addition, the present inventors have determined that there are tremendous advantages, such as large cost savings, derived from utilizing plugs that are reusable several times. Conventional plugs may pop out at inconvenient times, such as while a host product is being processed along a continuously conveyored bake oven. In such a case, when a plug pops out, it is usually no longer usable since it may end up sitting on an oven floor baking beyond its useful life. Therefore, a huge savings may result by, for example, ensuring ten or more uses for a valved plug compared with one use for a standard stopper.

Umbrella valves may be precisely designed to open and close at certain pressures. For example, opening pressures may be varied, inter alia, according to the modulus of elasticity, or stiffness, of the material used in forming the cap, according to the amount of preload on a relaxed (non-pressurized) cap, according to the effective flow area or volume, according to the type of edge shape for the cap, according to the size of the cap, and according to the thickness of the cap. A typical range of opening pressures for umbrella valves is from approximately 0.1 to 80 kPa, determined by the listed factors.

When a manufacturing engineer or technician prepares a masking setup for prepping parts to be baked in a powder-coating operation, she may select a particular cap type according to a measured or calculated internal pressure of the orifice, for example, based on the temperature and time period of the bake. She may then select a material type for a cap, a diameter and thickness of the cap, a preload, etc. She may then select a cap having a stem diameter and shape for the particular orifice to be masked. A shape of the stem portion of a cap can include various protrusions, have a different length, etc. After selecting the proper cap for the given masking location, she may insert a needle 50 into the selected cap for subsequent installation into the given orifice.

When umbrella valve 10 is inserted into the given orifice, a pathway is created from inside the orifice through lower lateral hole 55, through air passage 53, through upper lateral hole 56, and into the space between the mounting surface and the underside 45 of cap 30. This pathway allows the pressure from inside the orifice to equalize with the pressure under cap 30, so that when the pressure goes above a threshold, an edge of cap 30 lifts off the mounting surface, releasing the pressure. After releasing the pressure, cap 30 reseats itself on the mounting surface thereby preventing backflow of contaminants into the valve.

Umbrella valve 10 effects improved protection against unwanted intrusion of foreign material into the orifice being masked. By providing lateral pressure pathways at the stem portion 33 of umbrella valve 10, it is less likely that foreign materials will violate the mask, compared with conventional umbrella valve structures that provide pressure relief pathways as vertical holes at a distance from a center of the umbrella valve. For example, valve 10 may be used for preventing contaminants such as paint from passing through or around valve 10 and entering an orifice being masked. In addition, gaskets or similar objects may be used as secondary seals for assuring that foreign materials do not violate the sealing of an orifice. For example, a gasket (not shown) may be placed around the cylindrical portion of needle 50 to form a sealing between a middle portion of needle 50 and an interior wall of the orifice. This will insure that the above-described pressure pathway of umbrella valve 10 is the only possible path and will provide extra precision in pressure control. Umbrella valve 10 may be provided with a stem portion dimensioned and configured as a plug for engaging in a sealing relationship with a target orifice. Such additional sealing measures may not be required to protect against violation of a mask during a particular process being performed, but may offer additional quality control, for example, when there is a possibility that handling or other event between process steps may risk intrusion of foreign matter such as the umbrella valve getting bumped when the host object is being moved from a cleaning area to an oven area.

It is noted that a stem portion such as stem 33 may be formed in any desired shape. For example, stem 33 may be formed as a plug having a tapered shape, threads, an enlarged lower portion, etc. Stem 33 may optionally be formed in multiple pieces for implementing modularity and reusability, as discussed further below. It is noted that a modular umbrella valve may be two, three, or more individual pieces. Since a stem portion may be formed in any shape, a two piece structure is possible. Such a structure may be quite useful for an operation that is only concerned with preventing inflow of contaminants, for example during washing. By using three components, such as by using a plug, precision masking may be effected, for example in a painting process.

As shown by way of examples in FIGS. 13–16, umbrella valve 10 may be part of a system that includes a separate plug 80 that, in turn, may be installed into the target orifice 88 in object 89 by twisting, pushing, screwing, etc. Stem 33 and needle 50 may respectively be inserted into center holes 85, 81 of an already-installed plug 80 or, alternatively, needle 50 and stem 33 at bottom portion 44 may be installed in plug 80 before inserting plug 80 into an orifice 88. Such a system provides an additional level of modularity. For example, plugs of different shapes and sizes may each have same size center holes 85, 81 for receiving stem 33 and needle 50. The center holes 85, 81 of plugs 80 each are formed so that the upper lateral hole 56 and lower lateral hole 55 are not blocked when the three components 33, 50, 80 are assembled. Shaft 50 is chosen to be long enough so that lower lateral hole 55 is below a bottom surface 82 of plug 80. Plug 80 may be a stopper, threaded, etc., or may be formed, for example, by pouring a resin material into an orifice and curing the resin. Center holes 85, 81 for receiving stem 33 and needle 50 may be formed by placing a center post in the orifice prior to pouring the resin, by punching, by a later hole forming process, etc. Similarly, stem 33 and needle 50 may be directly secured into an orifice by addition of a poured resin.

Figure 16:
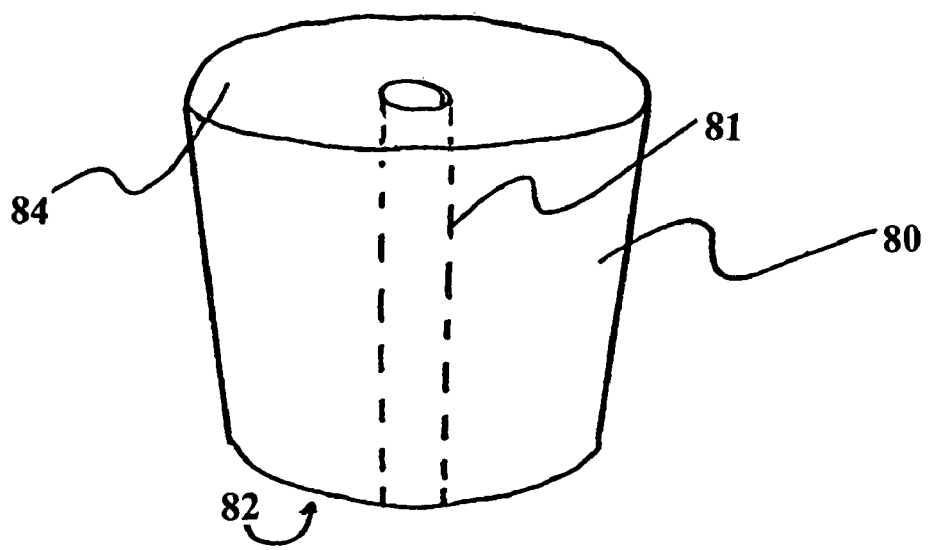
FIG. 16 shows a plug adapted for receiving an umbrella valve, according to an exemplary embodiment of the invention.

In another embodiment, plug 80 may be formed without center hole 85, as shown by example in FIG. 16. In such a case, bottom portion 44 of stem 33 either rests on a top portion 84 of plug 80 or is displaced a distance above top portion 84. Valve 10 may be snugly secured in plug 80 by the fit of needle 30 in hole 81, thereby eliminating a need for hole 85.

An assembly that includes plug 80 provides a masking device suitable for precision masking of orifice 88 while providing pressure relief and preventing contaminants from entering orifice 88. A release of pressure at outer edge portion 32 will not interfere, for example, with paint being sprayed onto a top surface of host object 89, and a dimension of cap 30 is independent of a size of orifice 88. For example, the circumference of cap 30 may be chosen for related pressure relief properties, while a plug 80 may be chosen to precisely fit an orifice 88 to be masked.

Plug 80 may be inserted into orifice 88 without regard to strain on included valve 10, especially in a configuration having center hole 81 and not having a hole 85. In such a case, for example, a metal needle 50 is resistant to being deformed and, as a result, valve 10 may be reused many times since it is undamaged by insertion of plug 80 into orifice 88. Slight damage to or deformation of plug 80 from insertion into orifice 88 is also of minor consequence because a subsequent use of plug 80 merely involves reseating in a different orifice 88. Therefore, component parts 10 and 80 are reusable many times, providing a large cost savings. A plug 80 may be discarded and valve 10 reused many times. A strong grip is formed between needle 50 and plug 80, so that the valve 10 may be gripped and pulled from a plug 80. A tool or other device may alternatively be used for installing or removing a valve 10 to/from a plug 80.

While needle 30 is not limited to being formed by any particular material, use of a metal such as stainless steel has an advantage in that when umbrella valve 10 is being used for masking an orifice of an object during a heating process in manufacturing, a stainless steel needle will conduct the heat and act in a self-cleaning manner. For example, when umbrella valve 10 is used for masking a hole in an object during a baking period of a powder coating type painting process, the stainless steel needle 50 will be heated and such heat sourcing will act to expel any foreign material that could possibly enter needle 50. Needle 30, especially head 51, may be cemented to stem 33 by using any suitable adhesive, for example, epoxy, cyanoacrylate, urethane, etc., depending on the adhesive's resistance to high temperature, chemicals, and other environmental, cost, availability factors, etc.

Other rigid, non-deformable materials may alternatively be used in forming a needle for use with the present invention. While it is also possible to use deformable materials such as silicone in forming needle 50, such may risk collapsing or clogging of a pressure pathway or reducing advantages of a rigid structure. The umbrella valve 10 may be formed using various rigid sections having one or more layers of different materials, including woven or braided layers, including materials such as fiberglass, block copolymer amide or similar, or other types of nylon, chemical or high temperature resistant materials, or any other polymers and extrudable materials, etc.

FIGS. 11–12 show a cap 130 and needle 150 in an alternate embodiment of the invention. For ease of correctly aligning exit holes 137 of a selected cap 130 with upper lateral hole 156 of a needle 150, the modular umbrella valve system uses a keying structure. A projection 161 is formed along an upper portion 160 of cylindrical body 152 to act like a key. A corresponding recess 141 is formed in stem portion 133 of cap 130. When needle 150 is being inserted into cap 130, a technician inserts key 161 into recess 141 while installing head 151 of needle 150 into end core portion 136 of stem 133, to assure that exit holes 137 of cap 130 are precisely aligned with upper lateral hole 156 of needle 150.

While the principles of the invention have been shown and described in connection with specific embodiments, it is to be understood that such embodiments are by way of example and are not limiting.

What is claimed is:

1. An umbrella valve comprising:
   an elastic cap;
   an elastic stem formed integrally with the cap, having a center hollow portion, having an enlarged hollow portion proximate the cap, and having a bottom; and
   a needle having an enlarged head at a proximal end thereof for being snugly secured in the enlarged hollow portion of the stem, having a lower lateral hole in a distal portion, having an upper lateral hole proximate the bottom of the stem, and having a lengthwise center passageway connecting the upper and lower lateral holes.

2. The umbrella valve of claim 1 wherein the needle is stainless steel.

3. The umbrella valve of claim 1 further comprising an adhesive for bonding the needle with the stem.

4. The umbrella valve of claim 1 wherein the stem has a lateral cutout opposing the upper lateral hole of the needle thereby providing at least one passage from the center passage way of the needle via the lateral cutout and the upper lateral hole of the needle.

5. The umbrella valve of claim 1 wherein the upper lateral hole is unblocked by the stem.

6. The umbrella valve of claim 1 wherein the cap has a radial shaped portion and an outer edge portion adapted to seat on a flat surface.

7. The umbrella valve of claim 1 wherein the upper lateral hole extends completely through the needle.

8. The umbrella valve of claim 1 wherein the lower lateral hole extends completely through the needle.

9. The umbrella valve of claim 1 wherein the elastic stem and the needle are keyed for aligning engagement with one another.

10. The umbrella valve of claim 1 further comprising a plug adapted for receiving the needle.

11. An umbrella valve comprising:
    an elastic cap having a sealing surface and having a stem extending from a center portion of the cap in a direction normal to the sealing surface, the stem having a center hollow portion, having an enlarged hollow portion, and having a bottom;
    a needle having an enlarged head at a proximal end thereof for being snugly secured in the enlarged hollow portion of the stem, having a lower lateral hole in a distal portion, having an upper lateral hole proximate the bottom of the stem, and having a lengthwise center passageway connecting the upper and lower lateral holes; and
    a plug adapted for receiving the needle.

12. The umbrella valve of claim 11 wherein the plug is adapted for receiving the needle and stem.

13. A modular umbrella valve system comprising:
    a plurality of elastic caps each having a radial shaped portion and an outer edge portion, the outer edge portion being formed along a mating plane, the elastic caps also each having a stem portion normal to the mating plane, each stem portion having a recess of a first size; and
    a needle having an enlarged head at a proximal end thereof for being snugly secured in the recess of any one of the plurality of elastic caps, the needle having a lower lateral hole in a distal portion, having an upper lateral hole proximate the bottom of the stem portion, and having a lengthwise center passageway connecting the upper and lower lateral holes.

14. The modular umbrella valve system of claim 13 wherein each of the plurality of elastic caps is different with respect to at least one of preload, umbrella skirt thickness, umbrella skirt shape, umbrella skirt diameter, and material used for forming the respective cap.

15. The modular umbrella valve system of claim 13 wherein each of the stem portions has a first key, the needle has a second key structured for engaging the first key, and wherein engagement of the first and second keys aligns orientation of any one of the plurality of elastic caps with the needle when the one cap is mated with the needle.

16. A method of customizing an umbrella valve comprising:
    providing a needle having a head at a proximal end thereof for being snugly secured in a recess of any one of a plurality of elastic caps, the needle having a lower lateral hole in a distal portion, having an upper lateral hole, and having a lengthwise center passageway connecting the upper and lower lateral holes;
    selecting an elastic umbrella cap from among the plurality of elastic caps, each elastic cap having the recess of a same size, by determining opening pressure factors including at least one of preload, umbrella skirt thickness, umbrella skirt shape, umbrella skirt diameter, and material used for forming the respective cap.

17. The method of claim 16 further comprising installing the needle into a selected one of the plurality of elastic caps.

18. A method of preparing an umbrella type check valve comprising:
    providing an elastic cap;
    forming an elastic stem integrally with the cap, the stem having a center hollow portion, having an enlarged hollow portion proximate the cap, and having a bottom; and
    inserting a needle having a head at a proximal end thereof into the stem by snugly securing the enlarged head into the enlarged hollow portion of the stem,
    wherein the needle has a lower lateral hole in a distal portion, has an upper lateral hole proximate the bottom of the stem, and has a lengthwise center passageway connecting the upper and lower lateral holes.

19. The method of claim 18 further comprising cementing the elastic stem to the needle.

20. The method of claim 18 wherein the elastic stem and the needle are keyed for aligning engagement with one another, the inserting including keyed engaging of the stem and needle.

21. A method comprising:
    providing an umbrella valve having:
        an elastic cap;
        an elastic stem formed integrally with the cap, having a center hollow portion, having an enlarged hollow portion proximate the cap, and having a bottom; and
        a needle having a head at a proximal end thereof for being snugly secured in the enlarged hollow portion of the stem, having a lower lateral hole in a distal portion, having an upper lateral hole proximate the bottom of the stem, and having a lengthwise center passageway connecting the upper and lower lateral holes; and
    installing the umbrella valve in an orifice for relieving pressure via the orifice while preventing contaminants from entering the orifice.

* * * * *